Nov. 8, 1949 — O. HORVATH — 2,487,243
MACHINE TOOL
Filed Jan. 19, 1945 — 2 Sheets-Sheet 1
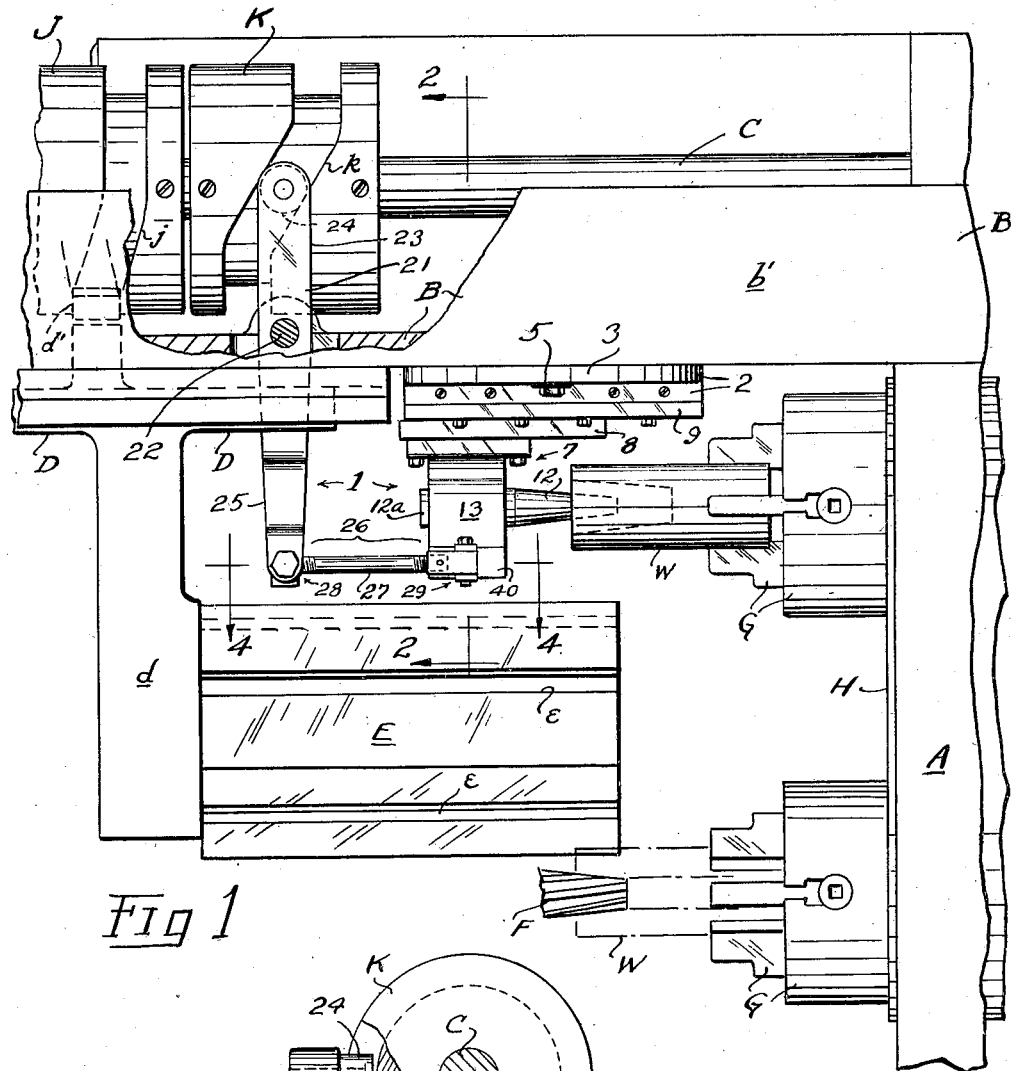
INVENTOR.
OLIVER HORVATH
BY George M. Soule
ATTORNEY Nov. 8, 1949     O. HORVATH     2,487,243
MACHINE TOOL
Filed Jan. 19, 1945     2 Sheets-Sheet 2
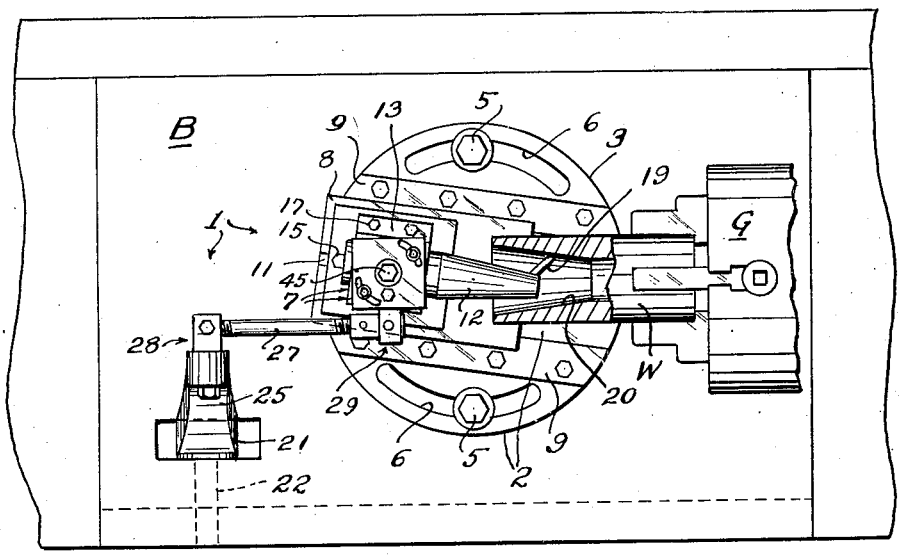
FIG 3
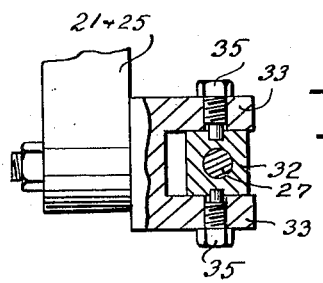
FIG 5
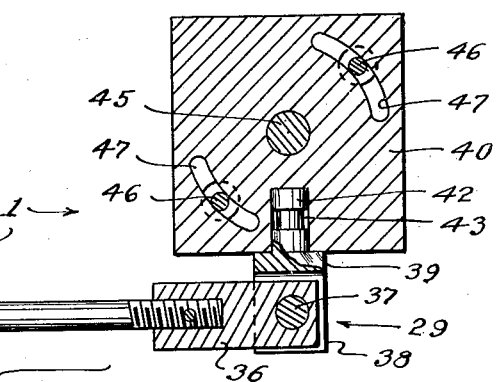
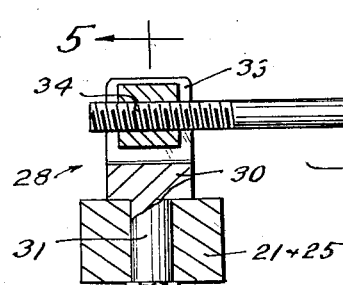
FIG 4
INVENTOR.
OLIVER HORVATH
BY
ATTORNEY Patented Nov. 8, 1949

2,487,243

UNITED STATES PATENT OFFICE 2,487,243

MACHINE TOOL

Oliver Horvath, Cleveland, Ohio, assignor to The Marquette Metal Products Company, Cleveland, Ohio, a corporation of Ohio Application January 19, 1945, Serial No. 573,501

1 Claim. (Cl. 29—57)

Automatic chucking machines of the type shown in United States Letters Patent 1,271,540 to Frank L. Cone are well adapted to perform progressive taper boring or reaming operations on parts such for example as wrist pin sleeves and other machine parts requiring inside cutting operations to be performed on them. The machines for cutting operations such as mentioned are provided with a series of cutting tools (e. g. reamers) arranged parallel to each other on respective tool fixture supporting faces of a main tool slide, and the work pieces are supported and rotated on parallel axes by automatically operated chucks which are given orbital movement by a turret coaxial with the tool slide. The chucks are automatically operated to grip each of the work pieces at one station with reference to the tool slide; thereafter to hold and rotate the work pieces until all the cutting operations of the various cutters have been performed, and then to release the work pieces serially at a common station. Cutting is effected by reason of axial movement of the slide by a rotary barrel type cam, thus simultaneously presenting all the cutters to the respective work pieces and meanwhile causing relative advancing or feeding movement of tools and work. The cutters are arranged progressively each in advance of its adjacent cutter on the tool slide for the number of cutters provided, so that, as the slide is reciprocated a fixed distance by the cam—once for each series of cutting operations—the cutting tools will be caused to cut the work to different depths. For example, the operations may comprise: (a) rough reaming, (b) second rough reaming, (c) semi-finish reaming and (d) finish reaming.

The last operation mentioned does not usually result in forming a very smooth surface because all the flutes of a reamer necessarily cut the metal simultaneously, resulting in a tendency to chatter. Even though the final cut taken can be a very light one the metal of the work tends to be torn rather than to be cut cleanly. The speed of advance of the cutter on final operation may be made less than the speeds of advance of the rough cutting and other cutting tools by making the finishing tool movable longitudinally relative to the tool slide and retarding its motion by a special or supplementary cam which is usually provided coaxial with the tool slide feeding cam; but even that does not produce as smooth a final cutting operation as is usually desired (or as would be desirable in any case) due to the inherent tendency of a reamer in an automatic machine to chatter.

An object of the present invention is to provide an improvement in machines of the class discussed above, wherein at least one cut, and particularly the final or finish cut, is performed essentially as a turning or side boring operation with a suitable tool or set of tools.

Other objects and the various advantages of the invention will be explained in or become apparent from the following description of one illustrative embodiment as shown in the drawings. The essential novel characteristics are summarized in the claim.

Referring briefly to the drawings,

Fig. 1 is a fragmentary longitudinal general assembly view of the principal working parts of a multiple spindle automatic chucking machine embodying the present invention;

Fig. 2 is a transverse sectional view thereof taken substantially along the line 2—2 on Fig. 1;

Fig. 3 is a bottom plan view of a portion of the upper bed of the machine and the improved mechanism hereof is shown in operation on a tubular work piece. The latter is shown partly in longitudinal section.

Figs. 4 and 5 are detail assembly views taken along the lines 4—4 and 5—5 on Figs. 1 and 4, respectively.

The lower main bed of the chucking machine shown by Fig. 1 (bed not shown) supports at least two heavy standards, one of which is partially shown at A. The standards carry an elongated upper bed, partially shown at B in the form of a channel casting. The upper bed B forms a bridge between or over the standards A. The standards support for rotation a cam shaft C parallel to the web $b$ and flanges $b'$ of the upper bed. One main purpose of the bed B is to form a longitudinal guideway for a base or slide block D which supports, or at least partially supports, the tool slide E through the intermediary of a depending arm $d$ on the slide block D. The tool slide may have additional (pilot) support in the chuck turret H described further below.

The tool slide E has a suitable number of planar faces (for instance five) all provided with parallel T-slots $e$ or other suitable means to support conventional cutting tools for adjustment toward and away from the work holders. One of such tools is partially shown on Fig. 1 at F in the form of a tapered reamer. The various cutting tools F are arranged concentric to the work holding fixtures G which are, for example, electrically opened and closed chucks for the work pieces W. The chucks are arranged in a circular series on the turret H supported for rotation coaxially of the tool slide E as on the illustrated standard A so that the chucks can be given orbital motion. The chucks G correspond in number and arrangement to the tool stations on the tool slide and usually, in case of a pentagonal tool slide, the latter mounts four tools at respective stations or slide faces. The remaining station is usually devoted to loading and unloading of the chucks with unfinished and finished work pieces.

The turret H and the cam shaft are operated in timed relationship so that a cam barrel J on the cam shaft works the tool slide E back and forth between successive machining operations by the cutting tools. The cam track $j$ of the cam J reciprocates the tool slide E through the intermediary of a roller $d'$ on the tool slide base D while the work holding chucks are held at the work stations, and then the turret H is rotated to advance the partly finished work pieces each to the next work station and the finished piece to the unloading and loading station.

The novel mechanism hereof in the form of a turning or side boring fixture 1 is mainly supported on the under flat side of the web $b$ of the upper bed B and is operated by a cam K which, as mentioned above, is usually provided to work a supplemental tool carrier (not shown) supported on one of the faces of the tool slide E. The cam H has a suitable cam track $k$ and both cams are adjustably fixed to the shaft C.

The base 2 of the turning fixture, as shown, is a generally rectangular block with an upper circular flange 3 bearing against and centrally supported from the bed B as by a bolt 4 (Figs. 1 and 2) and, additionally, for angular adjustment and clamping, by a plurality of studs 5 arranged in arcuate slots 6 of the circular flange and threaded into the bed to clamp the flange in adjusted position.

The lower face of the block 2 forms a guideway for a tool slide assembly 7 comprising, as shown best by Fig. 2, a carriage plate 8 grooved on its opposite sides slidingly to fit parallel guide bars or rails 9 on the block. A conventional gib is shown at 10. The carriage plate 8 has a downwardly facing T-slot 11 for its full length parallel to the rails 9; and a cutting tool supporting bar or arbor 12 is carried in a mounting block or tool post 13 of the assembly 7 by suitable means such as a clamping strip 14 (Fig. 2) in the T-slot 11 and securing bolts 15 extending upwardly from the mounting block or post 13 through the narrow part of the T-slot and into threaded openings of the strip 14 so that the mounting block can be fixedly secured to the carriage plate 8 and adjusted therealong. The cutting tool supporting bar or arbor 12 has a cylindrical shank 12a adapted to be clamped in the desired turned position on the tool post 13 by reason of the post being slotted at 16 at one side and having one or more clamping bolts 17 passing through the slot. The cutting tool 19, Fig. 3, is mounted near the free tapered end of the arbor 12 as in an oblique opening through the free end of the arbor, being suitably clamped or fixed in place on the arbor by means not shown.

Assuming that the last taper reaming operation performed by a tool F resulted in forming approximately the tapered hole or socket 20 in the work pieces W of Fig. 3; that the tool point or cutting face is properly set to make a cut tangentially of the tapered hole diametrally of the same; and that the slideway provided by the rails 9 is parallel to the appropriate side of the tapered hole 20 to be bored or finished, the proper cut will be taken when the tool post 13 and its carrier 8 traverses the slide.

Any taper (whether internal or external) can thus be formed or a cylindrical surface can be bored in or turned on the work piece by appropriate adjustment of the block 2 about the center bolt 4 on the upper bed B and appropriate design, setting and mounting of the cutting tool represented herein at 19.

To reciprocate the tool slide assembly 7 a lever 21 is mounted as on a suitable pivot bolt 22 of the bed B, or on a special vertically adjustable bracket (not shown) if desired. The upper arm 23 of the lever is connected to the cam K through a follower 24 and the lower arm 25 of the lever is connected by a link assembly 26 to the tool post 13.

The link assembly 26 includes two universal pivots generally designated 28 and 29 to compensate for the difference in motion required by the plane of operation of the lever 21 and the direction of operation of the tool slide assembly 7 particularly when operating to effect taper cuts. The pivot 28 on the arm 25 of the operating lever 21 moves up and down whereas the tool post moves strictly horizontally but in a plane at an angle to the swinging motion of the operating lever. The universal pivot 28 comprises a block 30 pivoted as on a cylindrical extension 31 of the block to the arm 25 of the lever 21. The block 30 is bifurcated as shown by Figs. 4 and 5 so as to accommodate a trunnion 32 between the parallel arms 33 of the block 30. The trunnion 32 is threaded at 34 to the link 27 for lengthwise adjustment of the link to lengthen and shorten it. The trunnion may be secured to the arms 33 of the pivot block 30 as by studs 35, Fig. 5. A similar construction is employed at the opposite end of the link 27 for connection to the tool post 13. The right hand end of the link, as shown, has secured thereto an attachment piece 36 pivoted as on a bolt or pin 37 between parallel arms 38 of a horizontal pivot block 39. The pivot block 39, in turn, is pivotally secured to an adjustable head plate 40 arranged for turret-wise attachment to the bottom face 41 of the tool post.

To secure the pivot block 39 in place on the headplate 40 so that the pivot block can turn in a vertical plane (see Fig. 4), said block 39 has a pin portion 42 entering a mating socket in the adjacent side face of the headplate. The pin portion 42 is of reduced diameter between its ends to provide a peripheral groove at 43 so that the block 39 can be secured for free turning in the socket of the headplate as by a screw or stud 44, Fig. 2, extending into the socket and the peripheral groove and supported by the headplate. The turret-wise adjustment of the plate 40 is desirable in order to be able to position the pivot block 29 with its axis substantially at right angles to the swinging motion of the operating link 27. As shown (Fig. 2) the headplate 40 is centrally attached to the face 41 of the tool post 13 by a stud or screw 45 and, additionally, for arcuate adjustment and clamping, by screws 46 (Figs. 2 and 4) passing through arcuate slots 47 in the plate 40 and into threaded openings intersecting said bottom face 41 of the tool post.

With the arrangement described the to and fro motion of the operating lever 21 incident to rotation of the cam K and its cam track $k$ is transmitted to the tool post 13 without any binding or loss of motion and because of the adjustable direction of extent of the guide formed by the rails 9 the working end of the cutter tool 19 can, as previously mentioned, be along any desired line in order to perform a finishing cut of uniform depth as will be particularly apparent from Fig. 3. The finish cut enabled by what is essentially a turning or true boring operation does not tend to tear the metal of the piece as does the operation of a reaming tool; and there is almost no strain on the machine as compared to that incident to reaming.

The ratio of the upper and lower arms of the operating lever 21 is preferably approximately 1:2 so that, with a cam K the total throw of which is the same as that of the cam J, the total movement of the cutter 19 would be about twice that of the total travel of the reamer tools F. Thus assuming each reamer cuts for a distance of two inches the turning cut performed by the tool 21 would be four inches. The relationship of the strokes of both the reamers and the turning tool can readily be altered by changing the cam tracks. Also by appropriate vertically adjustable mounting of the pivot 22 of the operating arm 21, the relative advancing speeds of the reaming and turning tools can be further altered as desired. The cam tracks $j$ and $k$ are suggestive only, not as actually used in practice in forming the wrist pin bearing sleeves W illustrated.

In the claim hereof the expression "automatic chucking machine" is hereby defined to mean a metal cutting machine wherein a plurality of work pieces are gripped serially by rotary chucks mounted for orbital movement and which are arrested from such movement opposite respective cutting tools arranged in alignment with the chucks, which cutting tools are then simultaneously advanced and retracted to cause first the cutting operations to be performed and second the cutters to be withdrawn whereby to enable a further orbital movement of the chucks to present new work pieces serially to the cutting tools.

I claim:

A turning tool supporting fixture for an automatic chucking machine, said fixture comprising a slideway adapted for angular adjustment on a bed of the machine generally over the usual turret for work gripping rotary chucks thereof, a tool post slidable on the slideway, a tool supporting arbor on the tool post, a head plate on the post, means to clamp the headplate in various angularly adjusted positions about the principal axis of the tool post, and operating means including a link for reciprocating the tool post on its slideway, said link having a universal pivotal connection with the headplate.

OLIVER HORVATH.

REFERENCES CITED

The following references are of record in the file of this patent:

UNITED STATES PATENTS

| Number | Name | Date |
| --- | --- | --- |
| 1,449,172 | Gendreau et al. | Mar. 20, 1923 |
| 1,604,115 | Drissner | Oct. 26, 1926 |
| 1,618,583 | Drissner | Feb. 22, 1927 |
| 1,647,368 | Lovely | Nov. 1, 1927 |
| 2,034,118 | Schlitters | Mar. 17, 1936 |
| 2,089,078 | Tyson | Aug. 3, 1937 |
| 2,219,694 | Miller | Oct. 29, 1940 |